US007778216B2

(12) United States Patent
Cho

(10) Patent No.: US 7,778,216 B2
(45) Date of Patent: Aug. 17, 2010

(54) BROADCASTING TERMINAL FOR UPDATING PILOT CHANNEL INFORMATION AND METHOD THEREOF

(75) Inventor: Nam-Shin Cho, Seoul (KR)

(73) Assignee: LG Electronics, Inc., Seoul (KR)

( * ) Notice: Subject to any disclaimer, the term of this patent is extended or adjusted under 35 U.S.C. 154(b) by 389 days.

(21) Appl. No.: 11/273,736

(22) Filed: Nov. 14, 2005

(65) Prior Publication Data

US 2006/0104236 A1 May 18, 2006

(30) Foreign Application Priority Data

Nov. 13, 2004 (KR) ...................... 10-2004-0092842

(51) Int. Cl.
*H04W 4/00* (2009.01)

(52) U.S. Cl. ........................ 370/328; 455/436; 455/574

(58) Field of Classification Search ................. 455/436, 455/574; 370/328
See application file for complete search history.

(56) References Cited

U.S. PATENT DOCUMENTS

2001/0048664 A1* 12/2001 Sano .......................... 370/235
2002/0006118 A1* 1/2002 Rodriguez et al. .......... 370/323
2002/0144290 A1* 10/2002 Ovadia ....................... 725/119
2003/0002472 A1* 1/2003 Choi et al. .................. 370/347
2003/0048753 A1* 3/2003 Jalali .......................... 370/252
2005/0002444 A1* 1/2005 Wei et al. .................... 375/147
2005/0047404 A1* 3/2005 Kim et al. ................... 370/382
2005/0083932 A1* 4/2005 Lee et al. .................... 370/390
2005/0085183 A1* 4/2005 Lee ........................... 455/3.01
2006/0232706 A1* 10/2006 Curet et al. ................. 348/474

FOREIGN PATENT DOCUMENTS

JP 2001156748 6/2001
JP 2004-112239 4/2004

OTHER PUBLICATIONS

Association of Radio Industries and Businesses (ARIB), "Transmission System for Digital Satellite Sound Broadcasting", ARIB STD-B41, V1.1, Jun. 5, 2003.

* cited by examiner

*Primary Examiner*—Patrick N Edouard
*Assistant Examiner*—Shantell Heiber
(74) *Attorney, Agent, or Firm*—Lee, Hong, Degerman, Kang & Waimey

(57) ABSTRACT

A satellite multimedia broadcasting terminal and method for updating pilot channel information is provided. By determining whether pilot channel information has changed and updating pilot channel information based on the determination, processing of unchanged pilot channel information can be minimized and the efficiency of a system enhanced.

26 Claims, 7 Drawing Sheets

BROADCASTING TERMINAL FOR UPDATING PILOT CHANNEL INFORMATION AND METHOD THEREOF

CROSS-REFERENCE TO RELATED APPLICATIONS

Pursuant to 35 U.S.C. §119(a), this application claims the benefit of earlier filing date and right of priority to Korean Application No. 10-2004-0092842, filed on Nov. 13, 2004, the contents of which is hereby incorporated by reference herein in their entirety.

BACKGROUND OF THE INVENTION

1. Field of the Invention

The present invention relates to a broadcasting terminal and, more particularly, to a portable satellite multimedia broadcasting terminal and method for updating pilot channel information.

2. Description of the Related Art

Recently, mobile communication terminals, such as a portable multimedia broadcasting terminal, a PDA (Personal Digital Assistant) terminal or a smart terminal, have been developed to provide various functions. Among the various functions, support of digital multimedia broadcasting covering audio, video and data services has been actively developed.

FIG. 1 illustrates an overview of one example of a conventional satellite multimedia broadcast system 1 that utilizes a DMB (Digital Multimedia Broadcasting) station 2 and a DMB terminal 3 and a mobile phone 4 with a DMB receiver. The satellite multimedia broadcasting system 1 allows a mobile user to receive multimedia information or data via the satellite multimedia broadcasting terminal 3 or DMB receiver equipped mobile phone 4.

Multimedia broadcasting systems have been separately developed as a terrestrial multimedia broadcasting system and a satellite multimedia broadcasting system. The satellite multimedia broadcasting system is classified as one of a system A, a system Dh and a system E. A system E satellite multimedia broadcasting system employs a CDM (Code Division Multiplexing) method and is applied to satellite multimedia broadcasting.

A satellite multimedia broadcasting system adopting the CDM method can operate a satellite multimedia broadcasting terminal with CDM channel configuration information. The CDM channel configuration information is included in pilot channel information. The pilot channel information refers to information regarding the analysis of reception signals, synchronization detection of spread signals, and control of the receiver as well as CDM channel configuration information.

The pilot channel information is transferred to the satellite multimedia broadcasting terminal through a pilot channel. Therefore, if the satellite multimedia broadcasting terminal fails to properly receive the pilot channel information included in the pilot channel, the terminal cannot be operated. Furthermore, if the pilot channel information included in the pilot channel transmitted by a broadcast station is changed, the pilot channel must be updated according to the changed pilot channel information so that the satellite multimedia broadcasting terminal can smoothly receive a broadcast service and operate properly. Accordingly, when a first processor at a receiving end of the satellite multimedia broadcasting terminal obtains pilot channel information at a pre-set period and provides the pilot channel information to a second processor, the second processor updates the pilot channel information.

FIG. 2 illustrates a flow chart of a conventional method for updating pilot channel information by a satellite multimedia broadcasting terminal. As illustrated in FIG. 2, when a pilot channel information period is set (step S11) and a satellite multimedia broadcasting terminal is operated (step S12), the first processor obtains pilot channel information (step S13). The first processor obtains pilot channel information at every pre-set period and transfers the pilot channel information to the second processor (step S14). The second processor checks the version number of the pilot channel information (step S15), and if there is a change in the version number (step S16), the second processor updates the pilot channel information (step S17).

Specifically, in the process illustrated in FIG. 2, the second processor determines whether to update the pilot channel information according to the pilot channel information received every pre-set period. If the version number of the pilot channel information has changed, the second processor updates the pilot channel information.

The time period at which the pilot channel information is updated by the second processor has a significant effect on a system. A first processor, such as a pilot channel information processing unit provided by the TOSHIBA™ corporation, obtains pilot channel information at a rate of at least every super frame period (76.5 ms) up to a maximum of every 16 super frame periods (1,224 ms) and unconditionally transfers the pilot channel information to a second processor, such as a CPU (Central Processing Unit), regardless of whether or not the pilot channel information has changed.

FIG. 3 illustrates the construction of a conventional transmission frame of a typical pilot channel. One frame has a length of 12.75 ms and includes pilot symbols (PS) of successive ones (11, . . . , 1) and a pilot channel data portion of Dns (D1~D51, n=1, 2, . . . , 51). Payload data, including actual information of a pilot channel, is contained in D3~D22 and D27~D46, and other pilot channel data has a specific value or a check value, such as Reed-Solomon parity check bits.

As illustrated, six frames form one super frame and one super frame has the length of 76.5 ms. Since pilot channel information is transferred to the second processor at such a relatively short time period and the second processor must perform the processes of receiving and comparing pilot channel information with existing pilot channel information every corresponding time period, the control burden of the second processor increases.

Specifically, the second processor must continuously receive the pilot channel information and compare it with the existing information even while processing an input of the user, performing an operation related to a user interface or performing an operation required for operating the broadcast receiver. Therefore, the second processor must facilitate high performance at a relatively high clock speed.

The pilot channel information is not changed unless a channel is changed or a broadcast operation is changed according to the management of a broadcasting service. However, because the pilot channel information is the most preferential reference information in the satellite multimedia broadcasting broadcast system, the system must be sensitive in its reacting to changes in the pilot channel information.

In the conventional method, the pilot channel information is obtained by the pilot channel information processing unit according to a relatively short period of from one super frame to approximately 16 super frames and is provided to the second processor of the satellite multimedia broadcasting terminal regardless of whether the pilot channel information has changed. The second processor then interprets the received new pilot channel information to determine whether the currently used pilot channel information has been changed. When there is a change in the pilot channel information, the second processor updates the existing content at every time period each, thereby increasing the operational burden of the second processor.

Therefore, there is a need for a satellite multimedia broadcasting terminal and method for updating pilot channel information that facilitates more efficient transfer of pilot channel information such that the operational burden of the second processor is decreased.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to a satellite multimedia broadcasting terminal and method for updating pilot channel information that is capable of reducing an operational burden of a CPU (Central Processing Unit). A comparison is made between pilot channel information received and pilot channel information previously received and the pilot channel information is transferred to the CPU only when it has changed.

Another object of the present invention is to provide a broadcasting terminal for updating pilot channel information capable of allowing a CPU to update pilot channel information only when the pilot channel information is updated, and its method.

Still another object of the present invention is to provide a broadcasting terminal for updating pilot channel information capable of burdening an operation burden of a CPU by allowing a pilot channel processing unit to determine whether or not pilot channel information needs to be updated and transferring only changed pilot channel information to the CPU, and its method.

To achieve at least the above objects in whole or in parts, there is provided a method for updating a pilot channel of a broadcasting terminal, including: obtaining and storing first pilot channel information by a first processor; obtaining second pilot channel information by the first processor and determining whether pilot channel information has been changed or not based on the first and second pilot channel information; and, updating the pilot channel information based on the second pilot channel information by the second processor, if the pilot channel information has been changed.

Preferably, in determining whether the pilot channel information has been changed or not, if the version number of the first and the second pilot channel information is different, it is determined that the pilot channel information needs to be changed.

To achieve at least these advantages in whole or in parts, there is further provided a broadcasting terminal for updating pilot channel information including: a first processor for sequentially obtaining pilot channel information according to a pre-set period, determining whether pilot channel information has been changed, and if pilot channel information has been changed, generating an interrupt to transfer the pilot channel information to a second processor to allow the second processor to change the pilot channel information; and the second processor for receiving the pilot channel information from the pilot channel processing unit only when the pilot channel information has been changed, and updating the pilot channel information.

Preferably, the first processor includes: a first memory for storing the version number of corresponding pilot channel information whenever pilot channel information is changed; a second memory for storing CDM channel configuration information transferred to the second processor so that the second processor can update the pilot channel information whenever the pilot channel information is changed; and a controller for comparing the version number of current pilot channel information and the version number of pilot channel information of a previous period to determine whether pilot channel information has been changed through logical calculation, generating an interrupt and transferring the CDM channel configuration information stored in the second memory to the second processor if the pilot channel information has been changed, and controlling to store the version number of the changed pilot channel information in the first memory.

To achieve at least these advantages in whole or in parts, there is further provided a digital multimedia broadcasting receiver including: a first processor; and a second processor cooperating with the first processor, wherein the first processor is adapted to perform the steps of, periodically receiving Digital Multimedia Broadcasting pilot channel information including configuration information having a version number for each Code Division Multiplexing channel, comparing at least one current version number related to currently received pilot channel information with at least one previous version number related to previously received pilot channel information, and sending the configuration information of at least one Code Division Multiplexing channel included in the currently received pilot channel information to the second processor according to the comparing, and wherein the second processor is adapted to perform updating of Digital Multimedia Broadcasting pilot channel information in accordance with the received configuration information from the first processor.

Additional advantages, objects, and features of the invention will be set forth in part in the description which follows and in part will become apparent to those having ordinary skill in the art upon examination of the following or may be learned from practice of the invention. It is to be understood that both the foregoing general description and the following detailed description of the present invention are exemplary and explanatory and are intended to provide further explanation of the invention as claimed. The objects and advantages of the invention may be realized and attained as particularly pointed out in the appended claims.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention is directed to a satellite multimedia broadcasting terminal and method for updating pilot channel information in a satellite multimedia broadcasting terminal. Although the invention is disclosed with regard to a satellite multimedia broadcasting terminal, it is contemplated that the invention may be applied for a wireless communication systems operating according to different standards.

Specifically, the satellite multimedia broadcasting terminal may be one used in any system that is different according to a country or an area in which it is utilized and which transmits and receives a digital multimedia broadcast signal. It is contemplated that the invention may be applied to systems transmitting and receiving signals such as DVB-H (Digital Video Broadcasting Handheld) and Media-Flo (Media-Forward link only) in addition to DMB (Digital Multimedia Broadcasting) satellite multimedia broadcasting signals.

A basic concept of the present invention is to enhance the efficiency of a satellite multimedia broadcasting communications system by minimizing the processing of the same pilot channel information by updating pilot channel information by a CPU (Central Processing Unit) only when the pilot channel information has changed. The present invention is described with reference to the accompanying drawings.

Figure 1:
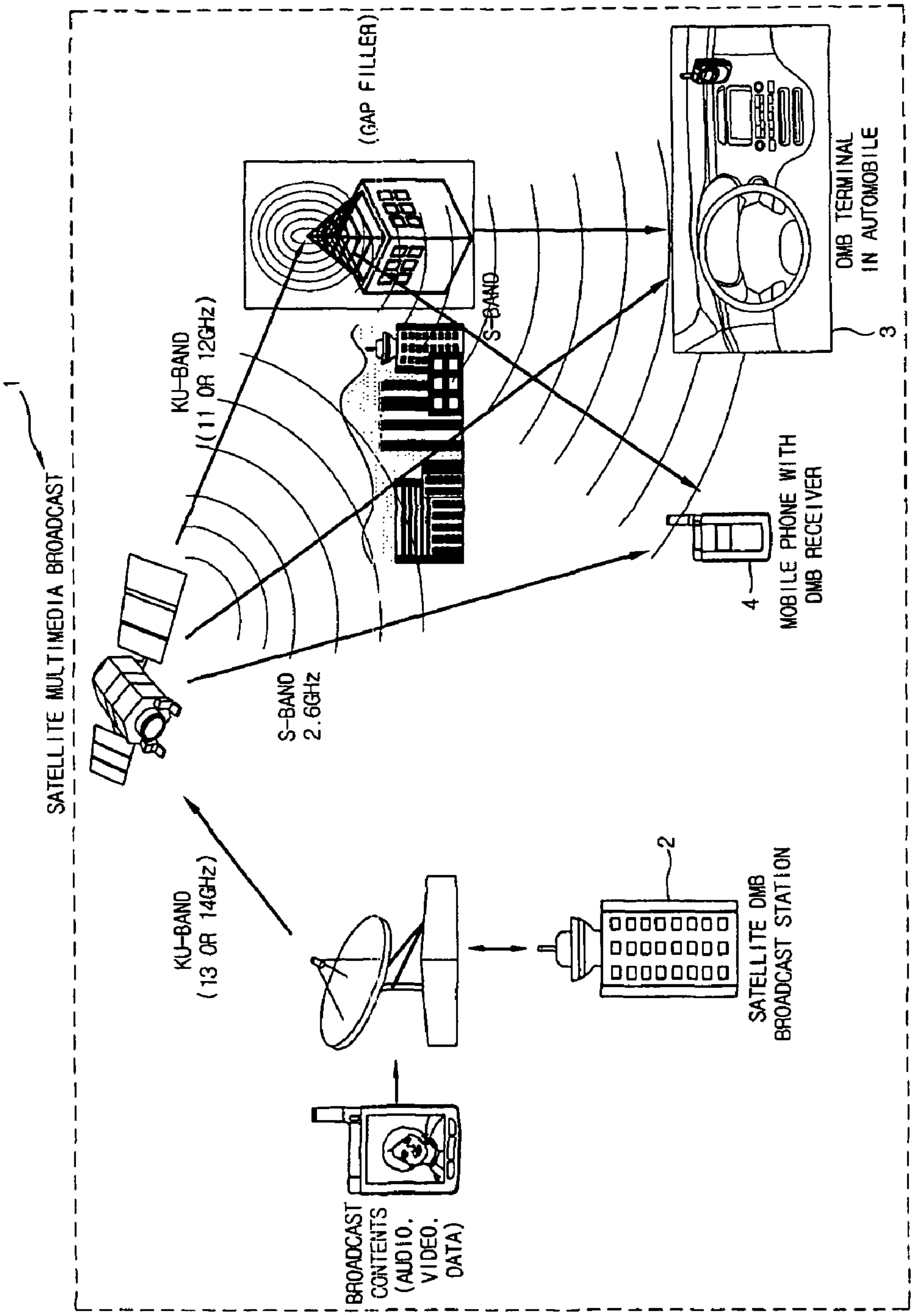
FIG. 1 RELATED ART
FIG. 1 illustrates an overview of a conventional satellite multimedia broadcasting system.
Figure 2:
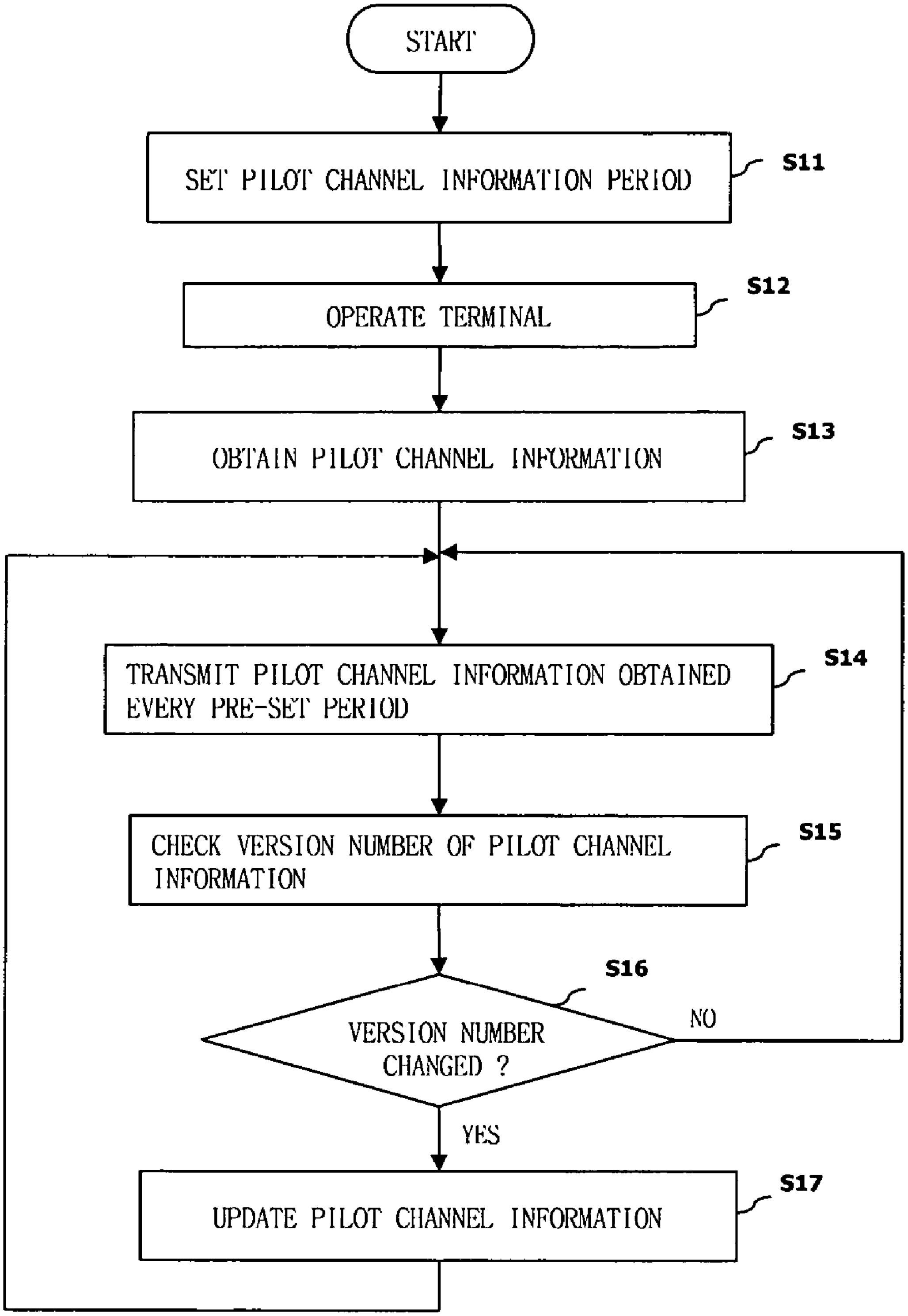
FIG. 2 RELATED ART
FIG. 2 illustrates a flow chart of a conventional process for updating pilot channel information in a satellite multimedia broadcasting terminal.
Figure 3:
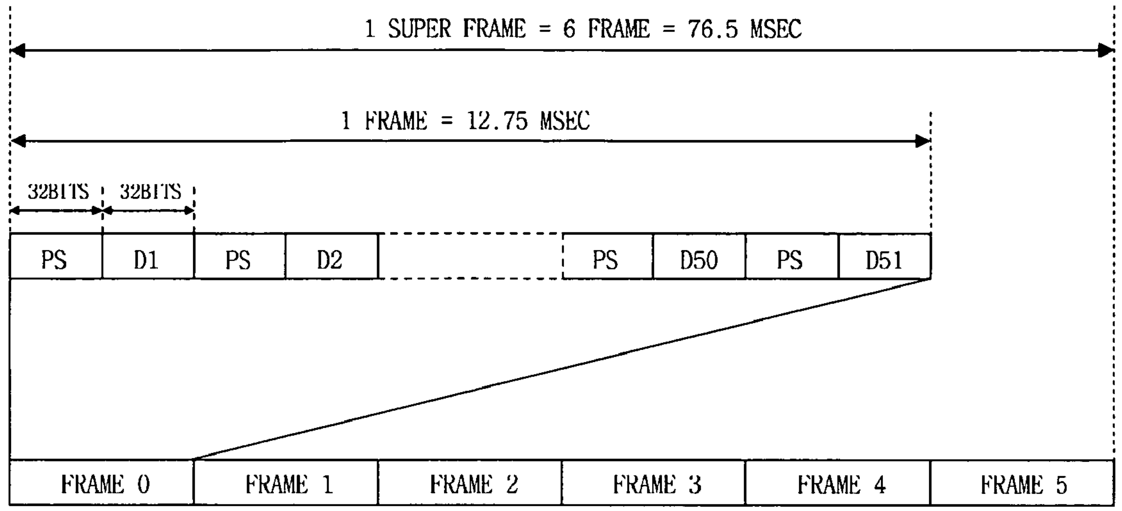
FIG. 3 RELATED ART
FIG. 3 illustrates a pilot channel transmission frame of a conventional satellite multimedia broadcasting terminal.
Figure 4:
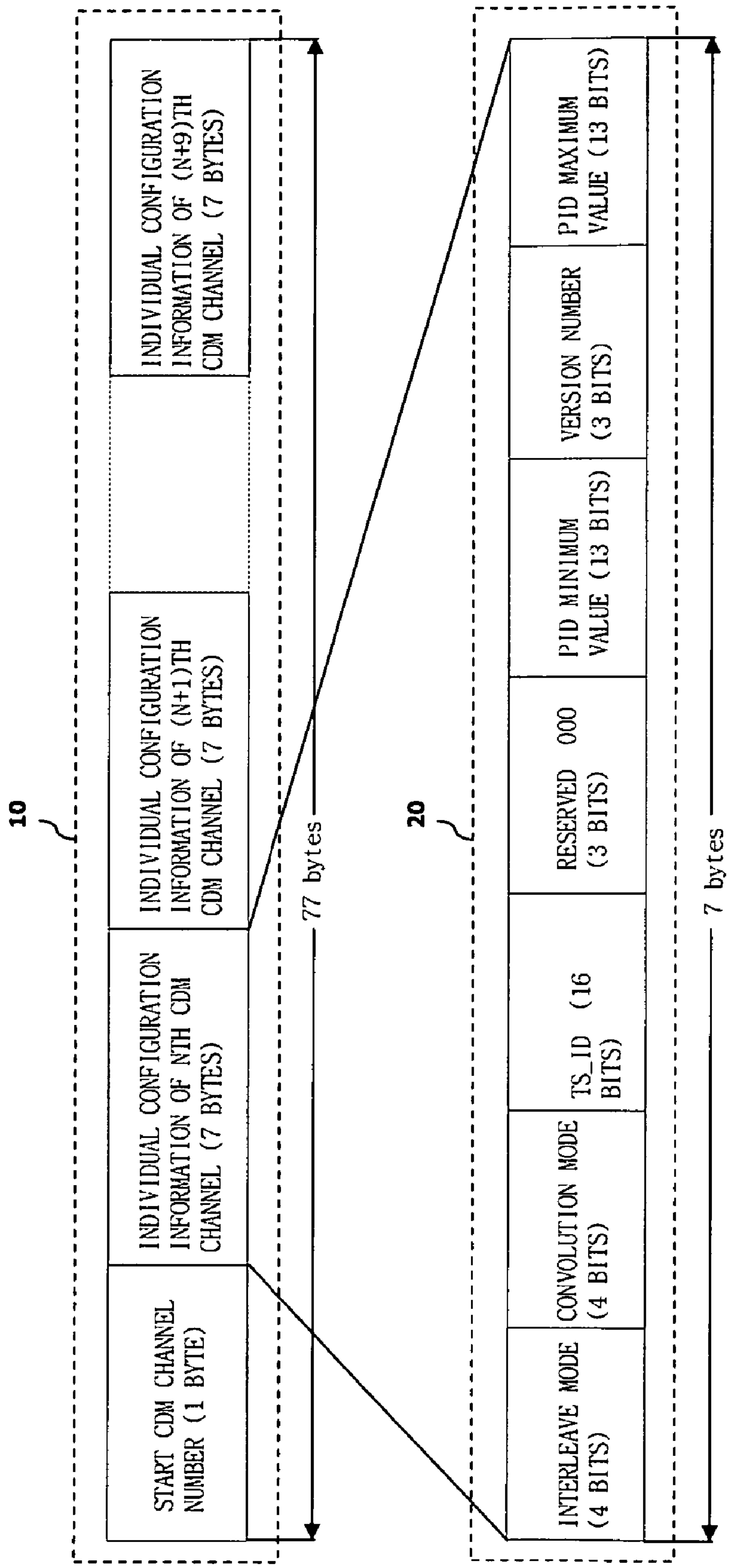
FIG. 4 illustrates a CDM channel information frame included in pilot channel information and a structure of a field of CDM channel configuration information according to one embodiment of the present invention.

FIG. 4 illustrates a CDM channel information frame 10 included in pilot channel information and a structure of a field of CDM channel configuration information 20 of each CDM channel included in the frame. As illustrated in FIG. 4, the CDM channel information frame 10 includes ten CDM channel individual configuration information portions 20 after a 'start CDM channel number field. The CDM channel individual configuration information portions 20, each including CDM channel number information, are arranged to form one frame.

Each CDM channel configuration information portion 20 includes 7 bytes. Specifically, each CDM channel configuration information portion includes a 4-bit interleave mode field designating the size of an interleave of a corresponding CDM channel, a 4-bit convolution mode field designating a coding rate of a convolution code of the corresponding CDM channel, a 16-bit TS_ID field designating a transmission stream identifier (transport_stream_id) to be transmitted by the corresponding CDM channel, a 3-bit reserved field, a 13-bit PID minimum value field indicating a minimum value of a PID range of a TS (Transmission stream) packet to be transmitted by the corresponding CDM channel, a 3-bit version number field that is updated by increasing the value by 1, and a 13-bit PID maximum value field indicating a maximum value of the PID range of the TS packet to be transmitted by the corresponding CDM channel.

It is noted that whenever the 3-bit version number field is updated, its value is increased by one. Specifically, when any information of a pilot channel is changed, a value of the version number field belonging to configuration information of a certain CDM channel having the changed content is increased by 1. Accordingly, the value of the 3-bit version number field existing at a certain position of each CDM channel configuration information 20 is extracted when pilot channel information is obtained according to a certain time period. The value is compared with a value of the version number field of the CDM channel configuration information 20 of a previous time period in order to determine whether the entire pilot channel information has been changed. A first processor is required for performing the comparison operation.

Figure 5:
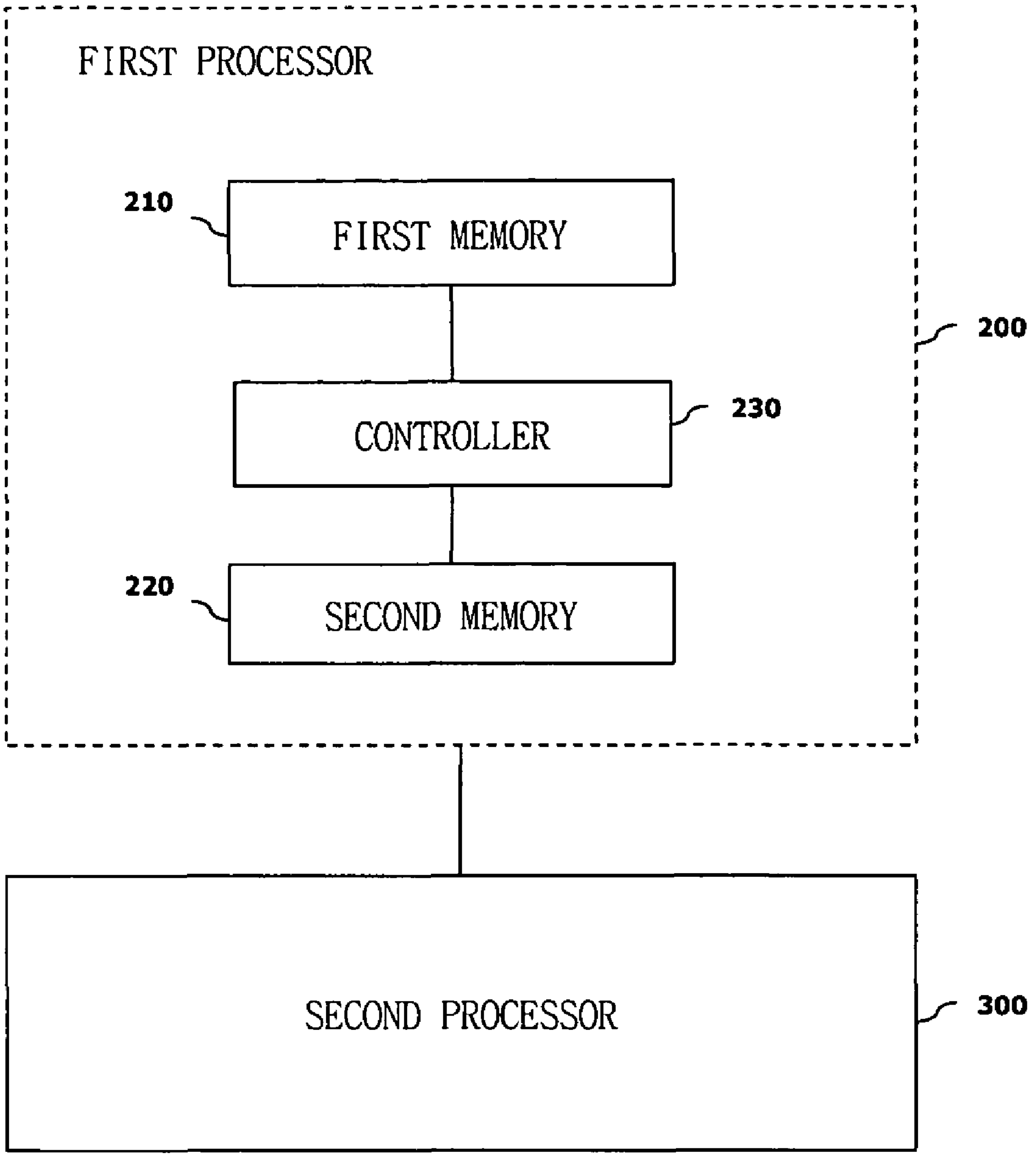
FIG. 5 illustrates a first processor in according to one embodiment of the present invention.

FIG. 5 illustrates a first processor in accordance with one embodiment of the present invention. As illustrated in FIG. 5, a first processor 200 includes a first memory 210, a controller 230 and a second memory 220. The first memory 210 is utilized for storing the version number of pilot channel information. The controller 230 obtains pilot channel information received according to a pre-set period, processes data, checks whether a value of the version number field of pilot channel information has been changed and generates an interrupt for transferring pilot channel information to a second processor 300 if the pilot channel information needs to be updated. The second memory 220 is utilized for storing CDM channel configuration information 20 of each CDM channel that has been obtained when the pilot channel information is processed by the controller 230.

Because it is difficult for the first processor 200 in the conventional terminal to compare the entire pilot channel information, which has a relatively large data size, at each period, the information is periodically provided to the second processor which can check whether the pilot channel has been changed. On the other hand, in the present invention, any changes in the entire pilot channel information may be determined by simply comparing only the fields containing the version numbers existing at a determined position within the CDM channel information frame 10, such that the present invention can be implemented by simple hardware or through simple software programming.

In the present invention, the first processor 200, rather than the second processor, determines whether the pilot channel information has been changed by hardware or through the controller 230 having a relatively simple logical calculation circuit, such as an exclusive ORing unit. The second processor can accept the changed pilot channel information using a method such as an interrupt procedure in order to update the existing content only at an initial connection procedure or only when the pilot channel information is changed.

Figure 6:
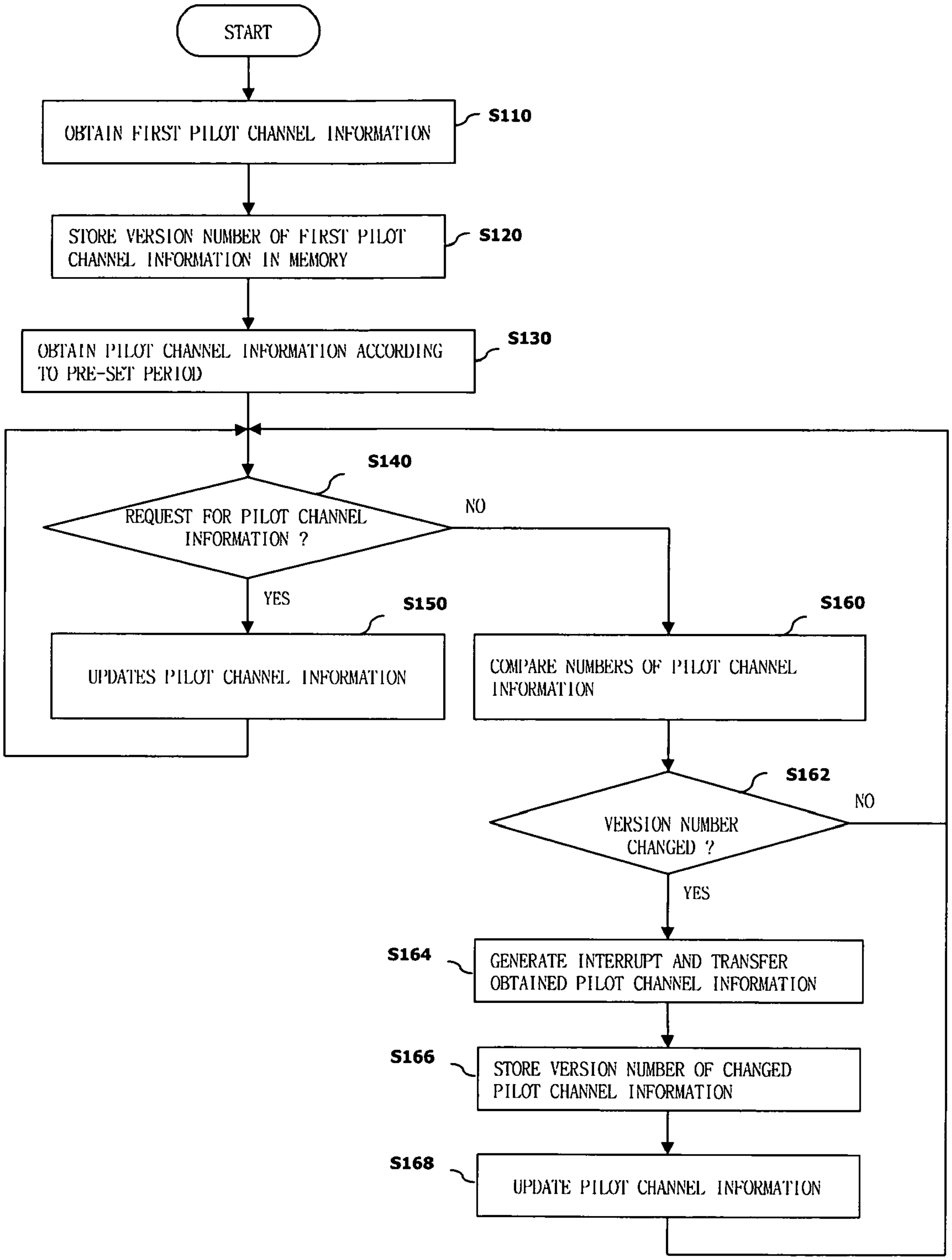
FIG. 6 illustrates a flow chart of a process for updating pilot channel information in a broadcasting terminal according to one embodiment of the present invention.

FIG. 6 illustrates a flow chart of a process for updating pilot channel information in a broadcasting terminal in accordance with the present invention. The flow chart illustrates an operation of the first processor 200 of the broadcasting terminal.

In order to operate the broadcasting terminal, CDM channel information included in pilot channel information must be obtained. Therefore, when the user operates the satellite multimedia broadcasting terminal by applying power to the terminal or by selecting to receive a digital multimedia broadcast signal with a terminal that supports mobile phone functions, the first processor 200 obtains first pilot channel information (first information) from a pilot channel transmitted by a satellite multimedia broadcasting station and transfers the first pilot channel information to the second processor (step S110). The controller 230 performs data processing on the obtained pilot channel information to extract CDM channel configuration information of each CDM channel and stores the CDM channel configuration information in the second memory 220. The controller 230 also obtains the version number of the CDM channel configuration information (first version number) corresponding to each CDM channel and stores the version numbers in the first memory 210 (step S120).

When the first processor 200 obtains pilot channel information (second information) corresponding to a next period based on a certain time period previously set by a user (step S130), such as a period of the arbitrary number of super frames or a period designated by a service provider, the controller 230 performs data processing on the obtained pilot channel information (second information) and stores each obtained CDM channel configuration information in the second memory 220. The controller 230 extracts the version number (second version number) value from each CDM channel configuration information and compares the second version number with a value of the version number (first version number) of the previous period stored in the first memory 210 by performing internal calculations, such as XORing, to determine whether the version numbers are the same (step S160).

If the values of the first and second version numbers are not identical, the controller 230 determines that the pilot channel information has been changed and needs to be updated (step S162). The controller 230 generates an interrupt or performs other appropriate procedures to transfer each CDM channel configuration information stored in the second memory 220 to the second processor (step S164) and stores the values of the changed version number (second version number) in the first memory 210 (step S166).

The controller updates the pilot channel information by applying each CDM channel configuration information received from the first processor 200 (step S168). This process is repeatedly performed in the first processor 200, which obtains pilot channel information according to the pre-set period. Only when the version number of a CDM channel configuration information 20 is changed does the second processor 300 update the pilot channel information.

If the second processor 300 requests the pilot channel information from the pilot channel information processing unit 200 (step S140), for example, to enhance the utilization of the pilot channel information, the first processor 200 unconditionally provides the latest pilot channel information to the second processor 300 regardless of whether the pilot channel information has changed. The second processor 300 then updates the pilot channel information (step S150).

Figure 7:
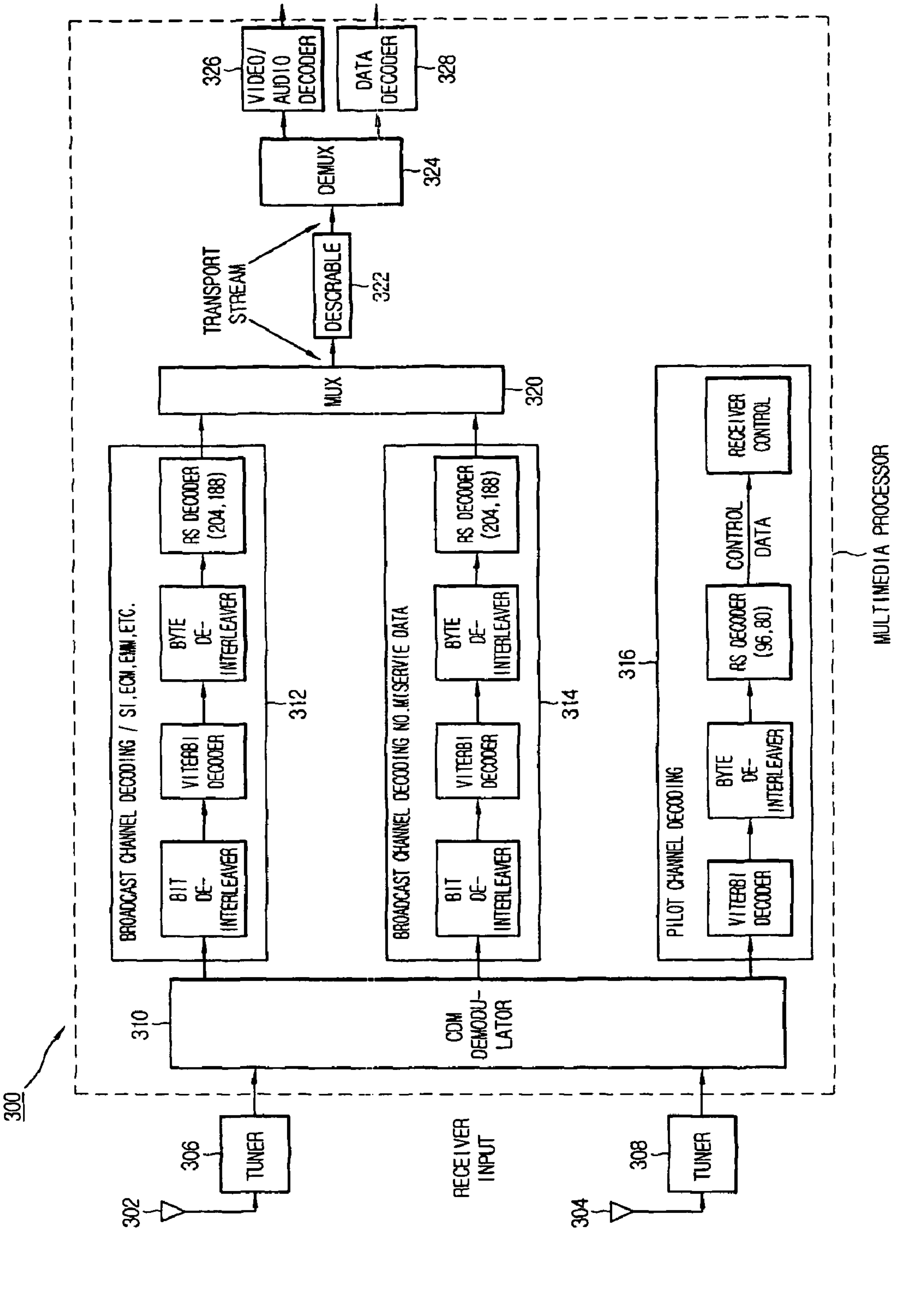
FIG. 7 illustrates an overview of a conventional satellite multimedia broadcasting receiver.

FIG. 7 illustrates a block diagram of digital multimedia terminal according to a preferred embodiment of the present invention. The digital multimedia terminal 300 comprises one or more antennas 302, 304 connected to corresponding tuners 306, 308 that are connected to a code division multiplexing (CDM) demodulator 310. The outputs of the CDM demodulator 310 are operationally connected to broadcast channel decoders 312, 314 and pilot channel decoder 316. The outputs of the broadcast channel decoders 312, 314 are connected to a multiplexer 320. The output of the multiplexer 320 is a transport stream and is inputted to a descrambler 322. The output of the descrambler 322 is inputted to a video/audio decoder 326 and a data decoder 328 through a demultiplexer 324.

According to the present invention, the first and second processors can be used in receiving digital multimedia broadcasting signals via satellite. The pilot channel information can be periodically received according to a time period set by the first processor. The version number can be indicated within a Code Division Multiplexing channel information frame. The pilot channel information is sent to the second processor only if at least one current version number is different than at least one previous version number. The pilot channel information is also sent to the second processor regardless of whether at least one current version number is different than at least one previous version number if second processor requests the Code Division Multiplexing channel configuration information included in the currently received pilot channel information. Although the present invention has been described with regard to a first processor and a second processor, it is contemplated that the invention may be performed using only one processor such that all function are incorporated into a single chipset.

As so far described, the satellite multimedia broadcasting terminal and method of the present invention has many advantages. The first processor of the satellite multimedia broadcasting terminal receives pilot channel information at a certain period, obtains version number field values of CDM channel configuration information of each CDM channel included in the CDM channel information frame of the pilot channel, compares it with version number field values of the same field obtained in a previous period, and provides corresponding information so that the second processor can update the pilot channel information only when a change is detected. Furthermore, the second processor does not need to be operated unnecessarily if there is little possibility that the pilot channel information is updated, and the operation burden of the second processor may be reduced. Moreover, because the processing rate and performance of the second processor may be lowered, costs and power consumption can be reduced and the burden of designing an operation program can be considerably reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for processing multimedia information in a satellite multimedia broadcasting terminal, the method comprising:

obtaining and storing, by a first processor, first pilot channel information from a pilot channel transmitted by a satellite multimedia broadcasting station;

determining whether the first pilot channel information is different from previously obtained second pilot channel information by comparing the first pilot channel information to the second pilot channel information;

transferring the first pilot channel information to a second processor only when the first pilot channel information is determined to be different from the second pilot channel information, wherein the first pilot channel information is not transferred to the second processor when the first pilot channel information is the same as the second pilot channel information;

updating, by the second processor, the second pilot channel information upon receiving the first pilot channel information from the first processor, wherein the second pilot channel information is not updated when the first pilot channel information is the same as the second pilot channel information; and utilizing the updated pilot channel information in a code division multiplexing (CDM) demodulator to process the multimedia information via at least one broadcast channel decoding unit, wherein the pilot channel information is required for operation of the terminal, the pilot channel information comprising information regarding analysis of reception signals and synchronization detection of spread signals, and CDM channel configuration information, and wherein comparing the first pilot channel information to the second pilot channel information comprises comparing a version number of the first pilot channel information to a version number of the second pilot channel information.

2. The method of claim 1, wherein the obtained first pilot channel information and the previously obtained second pilot channel information are obtained sequentially according to a period set by the first processor.

3. The method of claim 1, wherein the comparing the first pilot channel information to the second pilot channel information comprises comparing only fields including the version numbers of the first and second pilot channel information, wherein it is determined that the first pilot channel information has been changed if the version number of the first pilot channel information and the version number of the second pilot channel information are different.

4. The method of claim 1, further comprising storing the version number of the first pilot channel information upon determining that the first pilot channel information is different from the second pilot channel information.

5. The method of claim 4, wherein the storing the version number of the first pilot channel information comprises storing the version number of the first pilot channel information in a first memory, the first memory separated from a second memory in which CDM channel configuration information extracted from the first pilot channel information is stored.

6. The method of claim 4, further comprising using the stored version number of the first pilot channel information when determining whether subsequently obtained pilot channel information after the first pilot channel information has changed compared to the first pilot channel information.

7. The method of claim 1, wherein the first processor and the second processor are integrated into a single chipset.

8. The method of claim 1, further comprising:

requesting, by the second processor, pilot channel information from the first processor; and unconditionally providing, by the first processor, latest pilot channel information obtained to the second processor.

9. The method of claim 1, wherein the first pilot channel information and the second pilot channel information are obtained sequentially according to a period set by a user of the terminal or a service provider.

10. A method for updating a channel of a satellite digital multimedia broadcasting receiver, the method comprising:

obtaining first pilot channel information from a pilot channel transmitted by a satellite multimedia broadcasting station, using a pilot channel decoding unit;

checking a version number of the first pilot channel information;

updating pilot channel configuration information upon determining that the version number of the first pilot channel information is different from a version number of previously obtained second pilot channel information, wherein the pilot channel configuration information is not updated if the version number of the first pilot channel information is the same as the version number of the second pilot channel information; and utilizing the pilot channel information in a code division multiplexing (CDM) demodulator to process the multimedia information via at least one broadcast channel decoding unit, wherein the pilot channel information is required for operation of the receiver, the pilot channel information comprising information regarding analysis of reception signals and synchronization detection of spread signals, and CDM channel configuration information, and wherein a first processor checks the version number of the first pilot channel information and a second processor updates the pilot channel information upon receiving the first pilot channel information from the first processor, wherein the first pilot channel information is not received by the second processor when the first pilot channel information is determined to be the same as the second pilot channel information.

11. The method of claim 10, wherein it is determined that the first pilot channel information has been changed when the version number of the first pilot channel information is not identical to the version number of the second pilot channel information.

12. The method of claim 10, further comprising generating an interrupt to update the pilot channel configuration information when it is determined that the version number of the first pilot channel information is different from the version number of the second pilot channel information.

13. The method of claim 12, wherein the CDM channel configuration information is processed by the pilot channel decoding unit.

14. The method of claim 10, further comprising storing the version number of the first pilot channel information when it is determined that the version number of the first pilot channel information is different from the version number of the second pilot channel information.

15. The method of claim 10, further comprising:

the second processor requesting pilot channel information from the first processor; and the first processor providing latest pilot channel information obtained to the second processor regardless of identity between the version number of the latest pilot channel information and the version number of a previously obtained pilot channel information.

16. The method of claim 10, wherein the first processor comprises:

a first memory for storing the version number of the second pilot channel information; and a second memory for storing the first pilot channel information.

17. A satellite multimedia broadcasting terminal, comprising:

a pilot channel decoding unit for sequentially obtaining pilot channel information from a pilot channel transmitted by a satellite multimedia broadcasting station according to a pre-set period, determining whether recently obtained first pilot channel information has changed from previously obtained second pilot channel information and generating an interrupt to update the pilot channel information, wherein the pilot channel information is required for operation of the terminal, the pilot channel information comprising information regarding analysis of reception signals and synchronization detection of spread signals, and CDM channel configuration information; and a code division multiplexing (CDM) demodulator and at least one broadcast channel decoding unit for obtaining the pilot channel information to process multimedia information, wherein the pilot channel decoding unit generates the interrupt when it is determined that the first pilot channel information is different from the second pilot channel information, and wherein the interrupt is not generated when it is determined that the first pilot channel information is the same as the second pilot channel information, and wherein the pilot channel decoding unit comprises:

a first memory for storing a version number of the first pilot channel information;

a second memory for storing the first pilot channel information; and a controller for comparing the version number of the first pilot channel information to a version number of the second pilot channel information to determine whether the first pilot channel information is different from the second pilot channel information, generating the interrupt, updating the pilot channel information and storing the version number of the first pilot channel information in the first memory when the first pilot channel information is different from the second pilot channel information.

18. The terminal of claim 17, wherein the controller performs a logical calculation to determine whether the first pilot channel information is different from the second pilot channel information.

19. The terminal of claim 18, wherein when the pilot channel decoding unit updates the pilot channel information regardless of whether the first pilot channel information is different from or same as the second pilot channel information upon receiving a request for pilot channel information.

20. The terminal of claim 18, wherein the CDM channel configuration information is processed by the pilot channel decoding unit.

21. A satellite multimedia broadcasting receiver, comprising:

a pilot channel decoding unit for periodically receiving pilot channel information from a pilot channel transmitted by a satellite multimedia broadcasting station and updating pilot channel information, the pilot channel information comprising at least configuration information and corresponding version number, the configuration information and corresponding version number corresponding to a Code Division Multiplexing (CDM) channel, wherein the pilot channel information is required for operation of the receiver, the pilot channel information further comprising information regarding analysis of reception signals and synchronization detection of spread signals; and a CDM demodulator and at least one broadcast channel decoding unit for utilizing the pilot channel information to process multimedia information, wherein the pilot channel decoding unit comprises:

a first processor configured to compare the at least one version number from currently received CDM pilot channel information with a version number from previously received CDM pilot channel information; and a second processor configured to update the pilot channel information with the configuration information from the currently received CDM pilot channel information depending upon a result of the comparison, wherein the pilot channel information is updated only when the at least one version number from the currently received CDM pilot channel information is different from the version number from the previously received CDM pilot channel information.

22. The receiver of claim 21, wherein the pilot channel decoding unit receives multimedia broadcasting signals from a satellite.

23. The receiver of claim 21, wherein the pilot channel decoding unit sets a time period for periodically receiving the pilot channel information.

24. The receiver of claim 21, wherein the version number is indicated within a frame of CDM channel information.

25. The receiver of claim 21, wherein the pilot channel decoding unit does not update the pilot channel information when the version number from currently received CDM pilot channel information is the same as the version number of the previously received CDM pilot channel information.

26. The receiver of claim 21, wherein the pilot channel decoding unit is further configured to update the pilot channel information unconditionally regardless of the result of the comparison if a request for CDM channel configuration information is received.

* * * * *